Patented Sept. 2, 1941

2,254,652

UNITED STATES PATENT OFFICE 2,254,652

METHOD OF PREPARING HIGHER FATTY ACID ESTERS OF CELLULOSE

Gordon D. Hiatt and Carlton L. Crane, Rochester, N. Y., assignors to Eastman Kodak Company, Rochester, N. Y., a corporation of New Jersey No Drawing. Application August 16, 1940, Serial No. 352,918

10 Claims. (Cl. 260—225)

This invention relates to a method of making cellulose esters of the fatty acids of 10-18 carbon atoms in which phosphoric acid catalyst is employed in the initial portion of the esterification, and sulfuric acid is then added for the final portion of esterification.

Cellulose esters of fatty acids of 10-18 carbon atoms have been prepared heretofore but the products in those cases have contained unesterified or poorly esterified particles and refining has been necessary to remove those particles to obtain a uniform ester. In some cases, such as where sulfuric acid is used to catalyze the entire esterification, objectionable lowering of the viscosity may be encountered.

One object of our invention is to provide a method for preparing cellulose esters of fatty acids of 10-18 carbon atoms which results in a product which is substantially free of fibers and other insoluble or incompatible particles. Another object of our invention is to provide a method for preparing substantially fully esterified cellulose esters of the higher fatty acids without employing a substantial excess of the fatty acid.

A further object of our invention is to provide a process for preparing cellulose esters of fatty acids of 10-18 carbon atoms in which objectionable degradation of the cellulose is unnecessary. Other objects will appear herein.

We have found that a cellulose ester of a fatty acid of 10-18 carbon atoms, free of fibers, incompatible particles and the acid itself and having good uniformity can be prepared by reacting a cellulosic material containing free and esterifiable hydroxyl groups with an esterification bath comprising an impelling anhydride, the fatty acid in an amount not more than equivalent to the esterifiable hydroxyl groups, an inert solvent, phosphoric acid catalyst in the initial stages of the reaction and sulfuric acid catalyst in the final stages of the esterification.

The starting material for this reaction may be any esterifiable cellulosic material such as a cellulose ester, i. e. acetyl cellulose having free and esterifiable hydroxyl groups, or esterifiable cellulose, such as refined cotton linters or refined high alpha cellulose wood pulp. The initial esterifying mixture is made up of impelling anhydride, solvent, fatty acid of 10-18 carbon atoms and phosphoric acid. The phosphoric acid therein may be from 5-40% of the weight of the cotton; however, the proportion of phosphoric acid usually used will be within the range of 10-25%. If a cellulose compound, such as cellulose acetate, is used as the starting material, it is preferred that it either be in dispersed form or at least greatly swollen, as the fatty acids of 10-18 carbon atoms are either poor solvents for the cellulose compounds or non-solvents. The presence of a solvent in the reaction mass is desirable.

The treatment of the cellulose material with the initial esterification mixture is carried out at an elevated temperature, preferably approximately 150° F. As sulfuric acid is absent, an elevated temperature may be employed without deleteriously affecting the cellulose. A temperature between 100° F. and 200° F. may be employed for the portion of the esterification in which phosphoric acid is employed as the catalyst.

After there has been some indication that a partial esterification has occurred, sulfuric acid is then added to the mass. The amount of sulfuric acid added is between 3 and 15%, based on the weight of the cotton, with the preferred range being 5-10%. In the preparation of mixed esters, the sulfuric acid is added after the phosphoric acid catalyzed mixture has given a uniform dope which usually requires 1-3 hours at 100-150° F. In preparing the simple esters, the phosphoric acid treatment is continued until the cotton is well softened and a semi-dope has resulted. This usually requires 2-5 hours at 130°-160° F., the time required for this softening being dependent upon the amount of phosphoric acid used. For instance, with the use of 40% of phosphoric acid, based on the weight of the cotton, the time is somewhat shorter than where 15% of phosphoric acid is employed.

In preparing cellulose esters in accordance with our invention, any inert solvent may be employed. In preparing the mixed esters, the oxygenated solvents, which have no functional groups which react with the acids, may be employed. In this case the solvent which is employed should with the other constituents of the reaction mixture either dissolve the cellulose compound used as the starting material or have a substantial swelling action thereon. Solvents of this type, are methyl ethyl ketone, ethyl acetate and dioxan. For the simple esters, nonpolar solvents are most desirable. Solvents of this nature, which are useful, are chlorinated hydrocarbons such as ethylene chloride, methylene chloride or hydrocarbons, such as benzene and solvent naphtha. Obviously it is essential that the diluent cause the dissolving of the cellulose ester formed in the completed reaction mixture.

Any of the impelling anhydrides may be employed, such as chloroacetic anhydride or an alkoxy acetic anhydride such as methoxy acetic anhydride. The impelling anhydride is employed in the reaction in an amount preferably 100–300% of the theoretical, based on the esterifying acid. In the making of mixed esters, the higher fatty acids may be present in the esterifying mixture only in an amount to satisfy any proportion of the esterifiable hydroxyl groups in the cellulose starting material. This is true because the starting material is already a material which is soluble in organic solvents and, therefore the product obtained will be soluble in organic solvents. In the case of the simple esters, the starting material is cellulose. Therefore, sufficient acyl must be added to yield a product which is soluble in organic solvents. We have found this amount to be between 70–100% of the theoretical. As the presence of more than an unavoidable amount of higher fatty acid is undesirable at the completion of the esterification, the use of more than the amount of higher fatty acid necessary to satisfy the esterifiable hydroxyls is undesirable. If the prescribed conditions are followed, a product will be obtained having excellent viscosity, uniformity and brilliance with a very low amount of uncombined acid. For instance, a cellulose acetate stearate can be prepared by our process having up to 48–50% of combined stearyl with as low as 1–5% of uncombined stearic acid remaining in the reaction mass.

The higher fatty acids which may be employed are any of those having 10–18 carbon atoms, such, for example, as capric, palmitic and stearic acids. Although our process is intended for the unsubstituted fatty acids, it may be also employed for acids of this type in which substituents are present which do not markedly alter the properties of the acid. Also, acids, such as oleic acid, in which an unsaturated bond is present, may be employed either alone or mixed with other fatty acids within the range given. Obviously, instead of using a single acid, the mixture of acids might be employed. Our process is adapted primarily to the making of esters in which fatty acid groups of 10–18 carbon atoms are principally added to the cellulosic material which is esterified.

In adding the sulfuric acid, the temperature of the mass may be lowered prior to adding the sulfuric acid or the sulfuric acid may be added at the elevated temperature. This is possible because the lowering of the temperature will not cause separation of the ester from the reaction mass because at this point it contains sufficient higher acyl to assure solubility in the esterification bath. The addition of sulfuric acid at the elevated temperature does not detrimentally affect the ester as at this point it contains sufficient higher acyl to protect the cellulose structure from degradation by the sulfuric acid. Usually the esterification, using the sulfuric acid, is at a moderate temperature, as the catalytic power thereof is sufficient to promote the reaction without the addition of excessive heat to the mass. The temperature used in the later portion of the esterification with sulfuric acid catalyst is optional with the individual operator.

The following examples illustrate processes embodying our invention:

*Example I*

350 parts of cellulose acetate, having an acetyl content of 33%, was dispersed in a mixture of 580 parts of chloroacetic anhydride, 300 parts of ethyl methyl ketone and 200 parts of capric acid. A good dispersion results at a temperature of approximately 100° F. Fifty parts of phosphoric acid in 50 parts of ethyl methyl ketone was added and the mass was maintained at a temperature of approximately 150 F. At the end of 2½ hours, the temperature was lowered to approximately 115° F. and approximately 7⅓ parts of concentrated sulfuric acid in 50 parts of ethyl methyl ketone was added to the mass. The temperature was raised over a period of 1¾ hours to approximately 140° F. The resulting cellulose acetate caprate was found to be soluble in a wide variety of organic solvents.

*Example II*

Five pounds of cellulose acetate, having an acetyl content of 33%, was ground to a fine powder. A solution consisting of twelve pounds of ethyl methyl ketone, twelve pounds of chloroacetic anhydride and 6.6 pounds of stearic acid was added thereto and, mixing at approximately 150° F., produced a uniform, greatly swollen mass. Approximately 5 cc. of 85% phosphoric acid was added thereto. After two hours at 150° F., the mass had doped or softened sufficiently to allow the addition of approximately 15 cc. of 95% sulfuric acid. The mass was maintained at 150° F. for three hours at the end of which time the cellulose acetate stearate formed was precipitated therefrom such as with an acetic acid-water mixture. The cellulose acetate stearate was of uniform composition and was soluble in a wide variety of organic solvents.

Analysis of the product showed 16.9% of combined acetyl, 47.8% of combined stearyl and 5% of free stearic acid. The ester melts at 147° C. and chars at 220° C.

*Example III*

A mixture was made of 4 pounds of refined cotton linters, 24.7 pounds of chloroacetic anhydride, 16.9 pounds of commercial stearic acid and 0.8 pound of 85% ortho phosphoric acid. This mass was stirred at 150° F. for three hours. The cotton had lost its fibrous form and had softened sufficiently to indicate partial esterification. The temperature was dropped to 100° F. and 54 cc. of 95% sulfuric acid dissolved in one pound of chloroacetic anhydride was added. This mixture was heated to 160° F. over a period of two hours. A clear, smooth dope results which is free of fiber. The catalyst acids were neutralized with sodium bicarbonate and the mass was precipitated in glacial acetic acid. Precipitating in glacial acetic acid facilitates the recovery of the chloroacetic acid and the acetic acid. If, however, the solvents are not to be recovered, the precipitation may be in 60% aqueous acetic acid. The dried product analyzed 86% apparent stearyl. The melting point of the ester was 75° C. and the char point was 195° C.

*Example IV*

Three pounds of cotton linters was mixed with 20 pounds of chloroacetic anhydride, 12.7 pounds of stearic acid, four pounds of ethylene dichloride and 0.6 pounds of 85% ortho phosphoric acid. The mass was mixed for three hours at 150° F. The partially doped material was then cooled to 100° F. and 40.5 cc. of 95% sulfuric acid mixed in three pounds of ethylene dichloride was added thereto. The mixing was continued and the bath temperature was raised to 160° F. over a three-hour period. An excellent dope of cellulose stearate resulted. The ester was precipitated in the same manner as in the preceding example. This product melts at 83° C. and chars at 207° C.

We claim:

1. A method of preparing cellulose esters of aliphatic acids of 10–18 carbon atoms which comprises reacting upon a cellulosic material containing esterifiable hydroxyl groups with a reaction mixture free of sulfuric acid, comprising an impelling anhyride, a solvent, an aliphatic acid of 10–18 carbon atoms and phosphoric acid as the catalyst until a substantial amount but not all of the esterification has occurred, then adding sulfuric acid catalyst to the mass and completing the esterication.

2. A method of preparing cellulose esters of aliphatic acids of 10–18 carbon atoms which comprises reacting upon a cellulose ester containing esterifiable hydroxyl groups with a reaction mixture free of sulfuric acid, comprising an impelling anhydride, a solvent, an aliphatic acid of 10–18 carbon atoms and phosphoric acid as the catalyst until a substantial amount but not all of the esterification has occurred, then adding sulfuric acid catalyst to the mass and completing the estericaton.

3. A method of preparing cellulose esters of aliphatic acids of 10–18 carbon atoms which comprises reacting upon cellulose with a reaction mixture free of sulfuric acid, comprising an impelling anhydride, a solvent, an aliphatic acid of 10–18 carbon atoms and phosphoric acid as the catalyst until a substantial amount but not all of the esterification has occurred, then adding sulfuric acid catalyst to the mass and completing the esterification.

4. A method of preparing cellulose esters of aliphatic acids of 10–18 carbon atoms which comprises reacting upon a cellulosic material containing esterifiable hydroxyl groups with a reaction mixture free of sulfuric acid, comprising chloroacetic anhydride, methyl ethyl ketone, an aliphatic acid of 10–18 carbon atoms and phosphoric acid as the catalyst until a substantial amount but not all of the esterification has occurred, then adding sulfuric acid catalyst to the mass and completing the esterification.

5. A method of preparing cellulose acetate caprate which comprises reacting upon an acetyl cellulose containing esterifiable hydroxyl groups with a reaction mixture free of sulfuric acid, comprising an impelling anhydride, a solvent, capric acid and phosphoric acid as the catalyst until a substantial amount but not all of the esterification has occurred, then adding sulfuric acid catalyst to the mass and completing the esterification.

6. A method of preparing cellulose caprate which comprises reacting upon cellulose with a reaction mixture free of sulfuric acid, comprising an impelling anhydride, a solvent, capric acid and phosphoric acid as the catalyst until a substantial amount but not all of the esterification has occurred, then adding sulfuric acid catalyst to the mass and completing the esterification.

7. A method of preparing cellulose caprate which comprises reacting upon cellulose with a reaction mixture free of sulfuric acid, comprising an impelling anhydride, capric acid and phosphoric acid as the catalyst until a substantial amount but not all of the esterification has occurred, then adding sulfuric acid catalyst to the mass and completing the esterification.

8. A method of preparing cellulose acetate stearate which comprises reacting upon an acetyl cellulose containing esterifiable hydroxyl groups with a reaction mixture free of sulfuric acid, comprising an impelling anhydride, a solvent, stearic acid and phosphoric acid as the catalyst until a substantial amount but not all of the esterification has occurred, then adding sulfuric acid catalyst to the mass and completing the esterification.

9. A method of preparing cellulose stearate which comprises reacting upon cellulose with a reaction mixture free of sulfuric acid, comprising an impelling anhydride, a solvent, stearic acid, and phosphoric acid as the catalyst until a substantial amount but not all of the esterification has occurred, then adding sulfuric acid catalyst to the mass and completing the esterification.

10. A method of preparing cellulose stearate which comprises reacting upon cellulose with a reaction mixture free of sulfuric acid, comprising an impelling anhyride, stearic acid, and phosphoric acid as the catalyst until a substantial amount but not all of the esterification has occurred, then adding sulfuric acid catalyst to the mass and completing the esterification.

GORDON D. HIATT.
CARLTON L. CRANE.